(12) United States Patent
Inui et al.

(10) Patent No.: US 7,395,441 B2
(45) Date of Patent: Jul. 1, 2008

(54) METHOD AND APPARATUS FOR SPECIFYING FACTORS THAT IMPEDE POWER SAVINGS OF A PROCESSOR

(75) Inventors: Takashi Inui, Yokohama (JP); Mizuho Tadokoro, Yamato (JP); Noritoshi Yoshiyama, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 423 days.

(21) Appl. No.: 11/284,582

(22) Filed: Nov. 22, 2005

(65) Prior Publication Data

US 2006/0107080 A1 May 18, 2006

(51) Int. Cl.
G06F 1/00 (2006.01)
G06F 1/32 (2006.01)
G06F 11/00 (2006.01)
(52) U.S. Cl. .................... 713/300; 713/320; 714/11
(58) Field of Classification Search ............... 713/300, 713/320
See application file for complete search history.

(56) References Cited

U.S. PATENT DOCUMENTS

| | | | | |
|---|---|---|---|---|
| 5,726,871 A | * | 3/1998 | Choi ........................ 363/89 |
| 5,978,932 A | * | 11/1999 | Nishiyuki et al. ........... 714/11 |
| 6,031,748 A | * | 2/2000 | Hong ........................ 363/89 |
| 6,510,518 B1 | * | 1/2003 | Jaffe et al. .................. 713/168 |
| 7,123,829 B2 | * | 10/2006 | Ohsuga ..................... 396/301 |
| 2001/0044332 A1 | * | 11/2001 | Yamada et al. ............. 455/574 |

FOREIGN PATENT DOCUMENTS

JP 10173832 A * 6/1998

* cited by examiner

*Primary Examiner*—Suresh K Suryawanshi
(74) *Attorney, Agent, or Firm*—Carlos Munoz-Bustamante; Dillon & Yudell LLP

(57) ABSTRACT

A data processing system capable of specifying impeding factors that impede power savings is disclosed. The data processing system includes a central processing unit, an operation mode detection unit, and an impeding factors specifying unit. The central processing unit has multiple operation modes, and each of the operation modes has a different rate of power consumption. The operation mode detection unit detects an operation mode of the central processing unit. Based on a history of operation modes of the central processing unit that was detected by the operation mode detection unit, the impeding factors specifying unit specifies a device that is considered as an impeding factor to power savings for the data processing system.

10 Claims, 3 Drawing Sheets

FIG. 2

| OPERATION MODE | OUTLINE |
|---|---|
| C0 | OPERATION MODE PERFORMING INSTRUCTION EXECUTION PROCESSING |
| C1 | OPERATION MODE FOR PERFORMING A CONSISTENCY CONTROL PROCESSING WITHOUT PERFORMING AN INSTRUCTION EXECUTING PROCESSING |
| C2 | OPERATION MODE FOR PERFORMING A CONSISTENCY CONTROL PROCESSING WITHOUT PERFORMING AN INSTRUCTION EXECUTION PROCESSING WITH AN INTERNAL CLOCKING OF THE CENTRAL PROCESSING DEVICE STOPPED |
| C3 | OPERATION MODE FOR PERFORMING NEITHER AN INSTRUCTION EXECUTION PROCESSING NOR A CONSISTENCY CONTROL PROCESSING WITH AN EXTERNAL CLOCKING OF THE CENTRAL PROCESSING DEVICE STOPPED |
| C4 | OPERATION MODE FOR PERFORMING NEITHER AN INSTRUCTION EXECUTION PROCESSING NOR A CONSISTENCY CONTROL PROCESSING WITH AN EXTERNAL CLOCKING OF THE CENTRAL PROCESSING DEVICE STOPPED, WHEREIN SOURCE VOLTAGE IS SMALLER THAN THAT OF C3 |

METHOD AND APPARATUS FOR SPECIFYING FACTORS THAT IMPEDE POWER SAVINGS OF A PROCESSOR

CROSS REFERENCE TO RELATED APPLICATIONS

The present application claims benefit of priority under 35 U.S.C. § 120 and § 365 to the previously filed international patent application number PCT/JP2004/007097 entitled, "System for Specifying Factors Impeding Power Saving, Information Processing Device, Methods of Specifying Factors Impeding Power Saving, Program, and Recording Medium," filed on May 25, 2004 with a priority date of May 27, 2003 based upon Japanese Patent Application No. 2003-148752, both of which are incorporated by reference herein.

BACKGROUND OF THE INVENTION

1. Technical Field

The present invention relates to data processing systems in general, and in particular to power savings in data processing systems. Still more particularly, the present invention relates to a method and apparatus for specifying factors that impede power savings of a processor within a data processing system.

2. Description of Related Art

In recent years, notebook computers have been equipped with functions that are comparable to desktop computers. As a result, the power consumption of notebook computers also increases.

In order to manage the power consumption of a notebook computer, it is important to reduce any unnecessary usage of the central processing unit within the notebook computer and to maintain the central processing unit in a low-power state whenever possible. For example, the mobile Pentium™ processor within a notebook computer is equipped with the SpeedStep™ technology that can reduce the power consumption of the mobile Pentium™ processor by decreasing its clock frequency and its supply voltage even during the execution of an application. Furthermore, in Windows™ XP, a performance monitor can be used to detect the operational state of a central processing unit, and the result can be displayed to a notebook computer user.

Although the SpeedStep™ technology allows the power consumptions of a central processing unit to be reduced, the performance of all open applications are also reduced. Also, the performance monitor equipped in Windows™ XP only displays the operational state to a notebook computer user, and it cannot supply a concrete means for reducing the power consumption to the notebook computer user.

Consequently, it would be desirable to provide an improved method and apparatus for specifying factors that impede power savings to a notebook computer user.

SUMMARY OF THE INVENTION

In accordance with a preferred embodiment of the present invention, a data processing system includes a central processing unit, an operation mode detection unit, and an impeding factors specifying unit. The central processing unit has multiple operation modes, and each of the operation modes has a different rate of power consumption. The operation mode detection unit detects an operation mode of the central processing unit. Based on a history of operation modes of the central processing unit that was detected by the operation mode detection unit, the impeding factors specifying unit specifies a device that is considered as an impeding factor to power savings for the data processing system.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2 is a table of operation modes of a central processing unit within the data processing system from FIG. 1, in accordance with a preferred embodiment of the present invention.

DETAILED DESCRIPTION OF A PREFERRED EMBODIMENT

Figure 1:
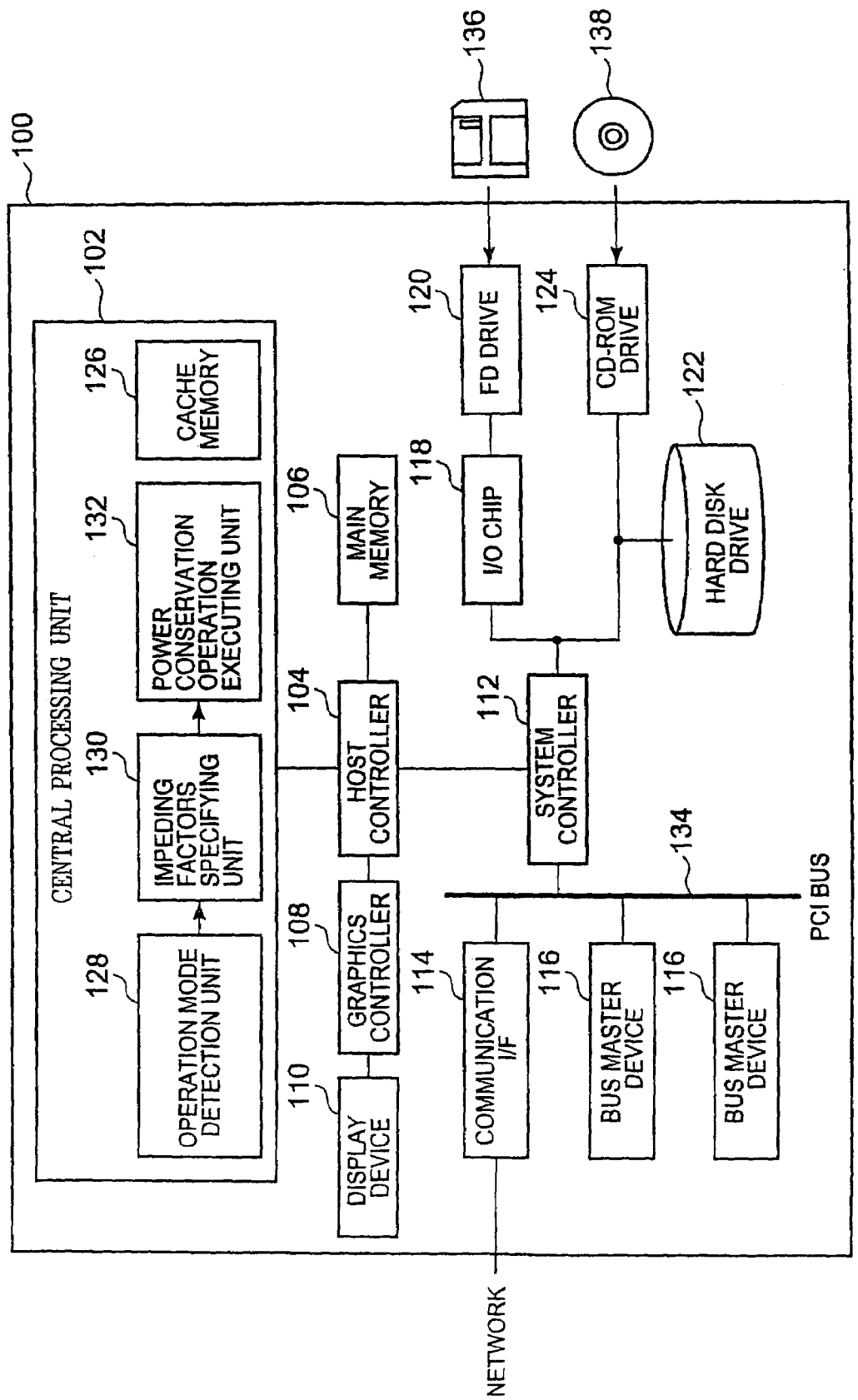
FIG. 1 is a block diagram of a data processing system in which a preferred embodiment of the present invention can be incorporated.

Referring now to the drawings and in particular to FIG. 1, there is depicted a block diagram of a data processing system in which a preferred embodiment of the present invention can be incorporated. As shown, a data processing system 100 includes a central processing unit 102, a host controller 104, a main memory 106, a graphics controller 108, a display device 110, a system controller 112, a communication interface 114, a bus master device 116, an input/output (I/O) chip 118, a flexible disk drive 120, a hard drive 122, and a CD-ROM drive 124. Data processing system 100 is preferably a mobile computer such as a notebook computer.

Host controller 104 connects main memory 106 to both graphics controller 108 and central processing unit 102, which access main memory 106 at a relatively high transfer rate. Graphics controller 108 obtains image data created on a frame buffer that is provided in main memory 106 by central processing unit 102, and displays the image data on display device 110. Graphics controller 108 may have a frame buffer, in which image data generated by central processing unit 102 are stored.

Central processing unit 102 executes instructions that are stored in main memory 116. Moreover, central processing unit 102 includes a cache memory 126 in which data being read from main memory 116 are stored, and performs a consistency control to ensure that the contents of cache memory 126 conform with the contents of main memory 116.

Central processing unit 102 has multiple operation modes, and each of the operation modes has a different power consumption rate. With reference now to FIG. 2, there is depicted a table of operation modes of central processing unit 102, in accordance with a preferred embodiment of the present invention. As shown, a C0 operation mode is an example of the first operation mode, a C1 operation mode and a C2 operation mode are examples of the second operation mode, and a C3 operation mode and a C4 operation mode are examples of the third operation mode.

The C0 operation mode is an operation mode for the instruction execution processing in which the instructions stored in main memory 106 are executed.

The C1 operation mode is an operation mode that does not perform instruction execution processing but performs the consistency control processing during which the contents of cache memory 126 of central processing unit 102 are made to conform with the contents of main memory 106. The C2 operation mode is an operation mode in which external clocking is provided to central processing unit 102; the internal clocking of central processing unit 102 is stopped; and, just like the C1 operation mode, instruction execution processing is not performed but the consistency control processing is performed.

The C3 operation mode is an operation mode in which the external clocking to central operation device 102 is stopped; instruction execution processing and consistency control processing are not performed; and the supply voltage to central processing unit 102 is set to a relatively low value (for instance, 1.05 V). The C4 operation mode is an operation mode just like the C3 operation mode, in which the external clocking to central processing unit 102 is stopped, instruction execution processing and consistency control processing are not performed, and the supply voltage to central processing unit 102 is set to be lower than the supply voltage of the C3 operation mode.

The above-mentioned operation modes may mutually differ in driving voltages or driving currents, and in clock frequency of the external clocking or internal clocking. Preferably, the power consumption rate becomes lower in descending order of operation modes, i.e., from the C0 operation mode to the C4 operation mode. Also, the C1 operation mode, the C2 operation mode, the C3 operation mode, and the C4 operation mode may mutually differ in latencies at the time when they are reset to the C0 operation mode. Central processing unit 102 transitions from one operation mode to another according to the request from any of host controller 104, graphics controller 108, system controller 112, communication interface 114, bus master device 116, and I/O chip 118.

Central processing unit 102 functions as an operation mode detection unit 128, an impeding factors specifying unit 130, and a power saving operation executing unit 132. Operation mode detection unit 128 detects the operation mode of central processing unit 102. Based on the history of the operation mode of central processing unit 102 detected by operation mode detection unit 128, impeding factors specifying unit 130 may specify one of communication interface 114, bus master device 116, and I/O chip 118 that sent a request to central processing unit 102 as an impeding factor that impedes the power savings of central processing unit 102. Also, impeding factors specifying unit 130 may specify a process within central processing unit 102 that responded to the request from host controller 104 as an impeding factor that impedes the power savings of central processing unit 102.

Hard drive 122 is an example of a power saving operation storing unit for the present invention. When impeding factors specifying unit 130 specifies impeding factors, power saving operation executing unit 132 executes the operation stored in a database within hard drive 122 to remove the impeding factors in question in order to comply with the impeding factors specified by impeding factors specifying unit 130.

Main memory 106 outputs the stored data to central processing unit 102 or bus master device 116. Main memory 106 also stores the data received from central processing unit 102 or bus master device 116. After receiving program and data from flexible disk drive 120, hard drive 122, or CD-ROM drive 124 through central processing unit 102, main memory 106 stores the program and the data.

Low-speed I/O devices, such as I/O chip 118 and flexible disk drive 120, and high-speed I/O devices, such as hard drive 122 and CD-ROM drive 124, are connected to system controller 112. After reading program or data from a flexible disk 136, flexible disk drive 120 provides the program or data to central processing unit 102 through main memory 106.

In addition to flexible disk drive 120, I/O chip 118 connects various I/O devices through a parallel port, a serial port, a keyboard port, and a mouse port, etc. Hard drive 122 stores the program and data used by data processing system 100. After reading program or data from a compact disc 138, CD-ROM drive 124 provides the program or data to central processing unit 102 through main memory 106.

Communication interface 114 and bus master device 116 are connected to system controller 112 through a peripheral component interface (PCI) bus 134. Bus master device 116 is a device that controls the I/O processing. Bus master device 116 can access main memory 106, if necessary. Communication interface 114 communicates with other devices through a computer network.

System controller 112 receives memory access request signals that are output so as to access main memory 116, from each of the I/O devices such as bus master device 116. System controller 112 provides bus master devices 116 access to main memory 106. System controller 112 frequently sends a stop instruction to central processing unit 102 when the operation mode of central processing unit 102 is the first operation mode. System controller 112 transits the operation mode of central processing unit 102 to the third operation mode when a stop permission is received from central processing unit 102.

System controller 112 receives an interrupt request for restarting the instruction execution processing of central processing unit 102, and sends the interrupt request to central processing unit 102 through host controller 104. After the receipt of the interrupt request, central processing unit 102 switches from the third operation mode to the first operation mode, and performs the instruction execution processing. The interrupt request here is an interval timer interruption that is input to make central processing unit 102 to regularly execute the instruction group for performing the processing for detecting the executable process.

When the operation mode of central processing unit 102 is in the third operation mode, system controller 112 receives an interrupt request for restarting the consistency control processing of central processing unit 102, and sends the interrupt request to central processing unit 102 through host controller 104. After the receipt of the interrupt request, central processing unit 102 switches from the third operation mode to the first operation mode, and performs consistency control processing. The interrupt request here is an I/O interruption output to central processing unit 102 from bus master device 116 through system controller 112 when bus master device 116 accesses main memory 106.

Figure 3:
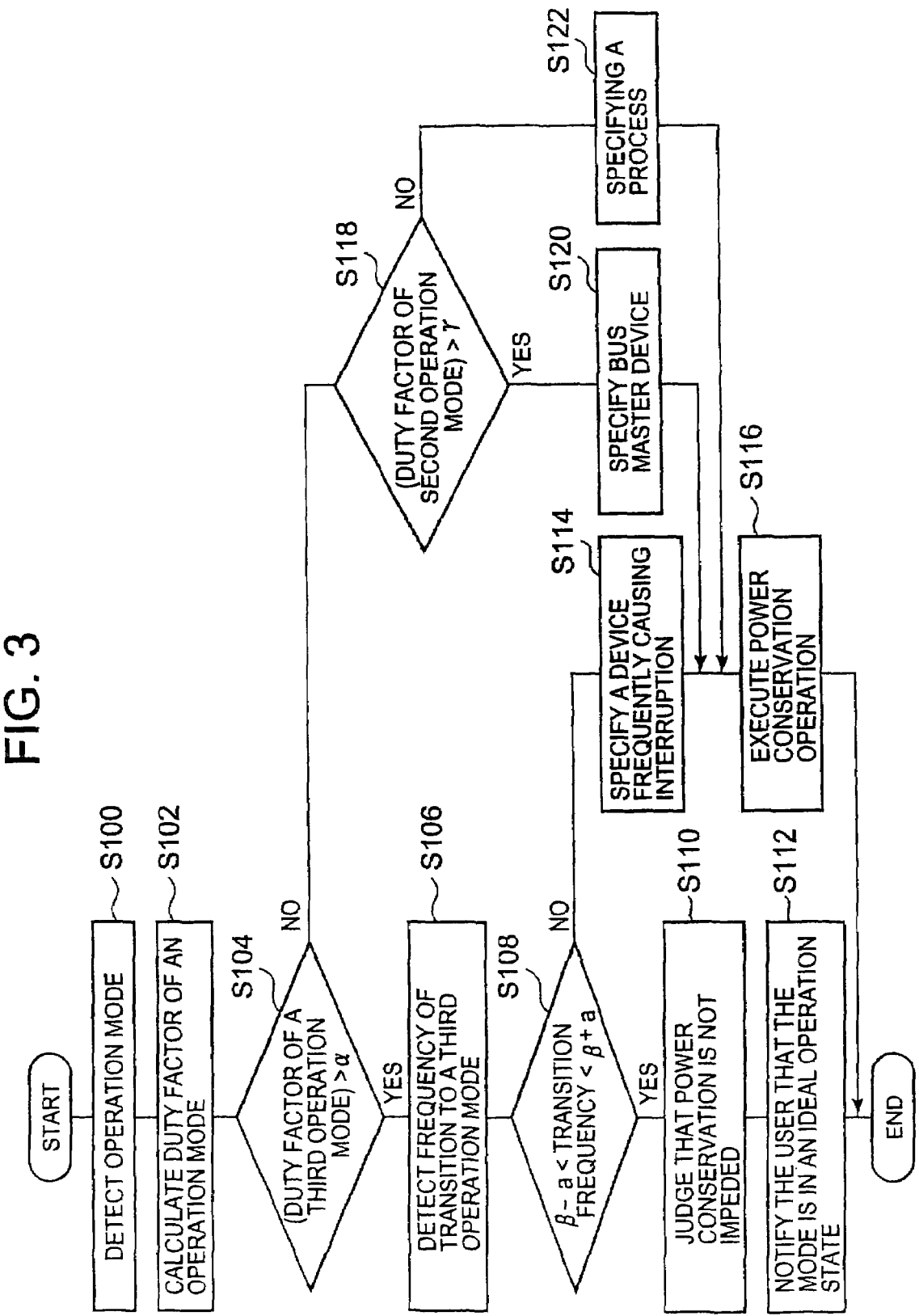
FIG. 3 is a high-level logic flow diagram of a method for specifying factors that impede power savings of the central processing unit from FIG. 2, in accordance with a preferred embodiment of the present invention.

Referring now to FIG. 3, there is illustrated a high-level logic flow diagram of a method for specifying factors that impede power savings to a notebook computer user, in accordance with a preferred embodiment of the present invention. Operation mode detection unit 128 (from FIG. 1) initially detects the operation mode of central processing unit 102 (from FIG. 1) for a predetermined amount of time, such as from several seconds to several minutes, as shown in block S100. Operation mode detection unit 128 then calculates the occupation rate of each of the available operation modes (such as the above-mentioned first operation mode, second operation mode, and third operation mode) of central processing unit 102, as depicted in block S102. The occupation rate can be obtained by monitoring the operation mode using an Application Program Interface (API) of an operation system.

A determination is then made as to whether or not the occupation rate of the third operation mode is greater than a predetermined setting value α (for example, 98%), as shown in block S104. For example, if the sum of the occupation rate of the C3 operation mode and the occupation rate of the C4 operation mode is greater than the predetermined setting value α, then operation mode detection unit 128 detects the frequency of transition (per unit time) of central processing unit 102 to the third operation mode, as depicted in block S106.

Another determination is then made as to whether or not the frequency of transition to the third operation mode is within a predetermined range, as shown in block S108. If the frequency of transition to the third operation mode is within the predetermined range, impeding factors specifying unit 130 determines that the operation state of central processing unit 102 is optimal, and concludes that the power saving of central processing unit 102 is not obstructed, as depicted in block S110. Next, power saving operation executing unit 132 informs the notebook computer user that central processing unit 102 is in an ideal operation state, as shown in block S112, by displaying such information in display device 110 (from FIG. 1).

The predetermined range of the frequency of transition in block S108 is calculated by the frequency of the interval timer interruption sent to central processing unit 102 from system controller 112. If the interval timer interruption is sent every 10 ms, the interrupt request to central processing unit 102 by the interval timer interruption arrives at about 100 times per second; thus, it is preferable that the frequency of transition to the third operation mode in central processing unit 102 to be approximately 100 times.

However, if the frequency of transition to the third operation mode falls outside of the predetermined range, then interrupt requests other than the interrupt request by the interval timer interruption occur too frequently. As a result, the frequency of transition to the third operation mode is increased and power saving of central processing unit 102 is obstructed. Thus, impeding factors specifying unit 130 specifies a device that sent a request to central processing unit 102 as an impeding factor, as shown in block S114. For example, impeding factors specifying unit 130 specifies a device that frequently caused interruptions by referring the source of the interrupt request such as an I/O interruption.

Power saving operation executing unit 132 executes the operation stored in the database of hard disk 122 in compliance with the device specified by impeding factors specifying unit 130, as depicted in block S116. Power saving operation executing unit 132 then displays a message in display device 110 to ask for permission from the notebook computer user to stop the operation of the device specified by impeding factors specifying unit 130. If permission to stop the device in question is given by the notebook computer user, power saving operation executing unit 132 stops the device in question, and operation mode detection unit 128 re-calculates the occupation rate of each of the operation modes. Impeding factors specifying unit 130 determines whether or not the device in question remains an impeding factor based on the occupation rate re-calculated by operation mode detection unit 128, and impeding factors specifying unit 130 notifies the notebook computer user with an appropriate solution.

If impeding factors specifying unit 130 specifies a device as an impeding factor, power saving operation executing unit 132 may stop the operation of the device in question without getting permission from the notebook computer user. For example, when impeding factors specifying unit 130 specifies communication interface 114 as an impeding factor, power saving operation executing unit 132 may stop the operation of communication interface 114 when communication interface 114 is not in active communication anymore.

If the occupation rate of the third operation mode less than the predetermined setting value α, a determination is made as to whether or not the occupation rate of the second operation mode is greater than a predetermined setting value γ (for example, 98%), as shown in block S118. For example, if the sum of the occupation rate of the C1 operation mode and the occupation rate of the C2 operation mode is greater than the predetermined setting value γ, central processing unit 102 executes consistency control processing due to the generation of access to main memory 116 by bus master device 126, which results in preventing from a transition to the C3 operation mode. Thus, impeding factors specifying unit 130 specifies bus master device 116 that accesses main memory 106, not through central processing unit 102, as an impeding factor, as shown in block S120. For example, impeding factors specifying unit 130 may specify impeding factors by checking the operational state of an universal serial bus (USB) controller and a video device.

Then, power saving operation executing unit 132 executes the operation stored in the database of hard disk 122 in compliance with bus master device 116 specified by impeding factors specifying unit 130, as depicted in block S116. Power saving operation executing unit 132 then displays a message in display device 110 to ask for permission from the notebook computer user to stop the operation of bus master device 116 specified by impeding factors specifying unit 130. If permission to stop bus master device 116 in question is given by the notebook computer user, power saving operation executing unit 132 stops the operation of bus master device 116 in question, and operation mode detection unit 128 re-calculates the occupation rate of each of the operation modes. Impeding factors specifying unit 130 determines whether or not bus master device 116 in question is still an impeding factor based on the occupation rate re-calculated by operation mode detection unit 128, and impeding factors specifying unit 130 notifies the notebook computer user with an appropriate solution. For example, a message such as "Please remove the USB mouse" or "The power saving is disturbed because of the video device; please replace video driver" can be displayed to the notebook computer use.

If the sum of the occupation rate of the C1 operation mode and the occupation rate of the C2 operation mode is not greater than the second predetermined setting value γ, impeding factors specifying unit 130 specifies a process being executed by central processing unit 102 as an impeding factors, as shown in block S122. If central processing unit 102 is executing several processes, impeding factors specifying unit 130 specifies one or more processes as impeding factors based on the usage rate of central processing unit 102 by each process detected by the performance monitor.

Power saving operation executing unit 132 executes the operation stored in the database within hard disk 122 in compliance with the process specified by impeding factors specifying unit 130, as depicted in block S116. Power saving operation executing unit 132 displays a message to ask for permission from the notebook computer user to stop the operation of the process specified by impeding factors specifying unit 130, and impeding factors specifying unit 130 notifies the notebook computer user with an appropriate solution.

In blocks S112 and S116, power saving operation executing unit 132 may communicate the information regarding the operational state of central processing unit 102 to the notebook computer user in a remote place through a communication network such as the Internet.

As an another example, when obtaining permission of the notebook computer user to stop the device, operation mode detection unit 128 may detect the operation mode and calculate several occupation rates, while stopping, in order, the operation of central processing unit 102 corresponding to the operation of a device that sent the request to central processing unit 102 or the request from the device. Then, impeding factors specifying unit 130 may specify the impeding factors that impede the power saving of central processing unit 102 based on the occupation rates calculated by operation mode detection unit 128.

As has been described, the present invention provides a method and apparatus for specifying impeding factors that impede power savings of central processing unit 102. By specifying a device or process that becomes an factor in impeding the power saving of central processing unit 102 based on the occupation rate of the operation modes of central processing unit 102, the impeding factors that are usually difficult for a notebook computer user to notice can be prominently displayed to the notebook computer user. Moreover, based on the operation stored previously in compliance with the impeding factors, the reasons why the power saving is being disturbed and the solution thereto are communicated to the notebook computer user, and the impeding factors can be removed either based on the instruction from the notebook computer user or automatically. As a result, it is possible to make central processing unit 102 to transit to the C3 operation mode and the C4 operation mode that have less power consumption. Accordingly, it is possible to provide power savings on central processing unit 102.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A data processing system capable of specifying impeding factors that impede power savings, said data processing system comprising:
    a central processing unit having a plurality of operation modes that mutually differs in power consumptions;
    an operation mode detection unit for detecting an operation mode of said central processing unit; and
    an impeding factors specifying unit for specifying a device that considered as an impeding factor to power savings for said data processing system based on a history of said operation modes of said central processing unit that was detected by said operation mode detection unit.

2. The data processing system claim 1, wherein
    said operation mode detection unit calculates an occupation rate of said plurality of operation modes by detecting said operation mode of said central processing unit for a predetermined time; and
    said impeding factors specifying unit specifies said impeding factor based on said occupation rate calculated by said operation mode detection unit.

3. The data processing system of claim 1, wherein said plurality of operation modes include a first operation mode for performing an instruction execution processing to execute the instruction, a second operation mode for performing a consistency control processing for conforming the content of a cache memory of said central processing unit to the content of a main memory, and a third operation mode that does not perform said instruction execution processing and said consistency control processing.

4. The data processing system of claim 1, wherein said impeding factors specifying unit specifies a process that said central processing unit is executing as said impeding factor on condition that said occupation rate of said first operation mode is greater than a predetermined setting value.

5. The data processing system of claim 1, wherein said impeding factors specifying unit specifies a process that may be causing said impeding factor based on the usage rate of said central processing unit with respect to said process.

6. The data processing system of claim 1, wherein said impeding factors specifying unit specifies a bus master device accessing a main memory, not through said central processing unit, as said impeding factor on condition that said occupation rate of said second operation mode is greater than a predetermined setting value.

7. The data processing system of claim 1, wherein
    said operation mode detection unit further detects the frequency of transition of said central processing unit to said third operation mode per unit time; and
    said impeding factors specifying unit specifies a device that sent a request to said central processing unit as said impeding factor, on condition that said occupation rate of said third operation mode is greater than a predetermined third setting value and that said frequency of transition to said third operation mode is beyond a predetermined setting range.

8. The data processing system of claim 1, wherein
    said operation mode detection unit further detects the frequency of transition of said central processing unit to said third operation mode per unit time; and
    said impeding factors specifying unit decides that power saving of said central processing unit is not prevented on condition that said occupation rate of said third operation mode is greater than a third setting value and said frequency of transition to said third operation mode is within a predetermined setting range.

9. The data processing system of claim 1, wherein said data processing system further includes
    a power saving operation storing unit for storing an operation to be executed in compliance with said impeding factor when said impeding factors specifying unit specifies said impeding factor; and
    a power saving operation executing unit for executing said operation stored in said power saving operation storing unit in compliance with said impeding factor specified by said impeding factors specifying unit in order to remove said impeding factor when said impeding factors specifying unit specifies said impeding factor.

10. The data processing system of claim 9, wherein said power saving operation executing unit stops an operation of said impeding factor specified by said impeding factors specifying unit when said impeding factors specifying unit specifies said impeding factor.

* * * * *